United States Patent [19]

Kilminster et al.

[11] 4,195,993
[45] Apr. 1, 1980

[54] COMPOUNDS WHICH RELEASE CYAN DYES OR DYE FORMING MATERIALS

[75] Inventors: Kenneth N. Kilminster, Linslade Leighton Buzzard; Colin Holstead, Abbots Langley, both of England

[73] Assignee: Eastman Kodak Company, Rochester, N.Y.

[21] Appl. No.: 934,454

[22] Filed: Aug. 17, 1978

[30] Foreign Application Priority Data

Dec. 12, 1977 [GB] United Kingdom ............... 51648/77

[51] Int. Cl.² .......................... G03C 5/54; G03C 1/40; G03C 1/76; G03C 1/10
[52] U.S. Cl. .................................... 430/225; 430/505; 430/544; 430/561
[58] Field of Search ..................... 96/29 D, 77, 99, 73

[56] References Cited

U.S. PATENT DOCUMENTS

| | | | |
|---|---|---|---|
| 3,942,987 | 3/1976 | Landholm et al. | 96/77 |
| 4,013,635 | 2/1977 | Landholm et al. | 96/29 D |

*Primary Examiner*—Richard C. Schilling
*Attorney, Agent, or Firm*—Arthur H. Rosenstein

[57] ABSTRACT

Cyan azo dye-providing compounds have the formula:

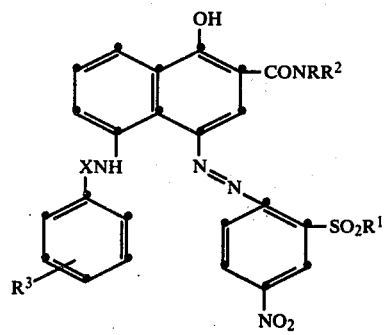

wherein:
  $R^1$ is selected from the group consisting of aryl, alkyl or $NR^{11}R^{12}$ wherein $R^{11}$ is alkyl or aryl and $R^{12}$ is alkyl, or $R^{11}$ and $R^{12}$, taken together with the nitrogen atom to which they are attached, is a heterocyclic group;
  X is —CO— or —SO$_2$—;
  $R^3$ is —COOH or —CAR and is attached in the meta or para position to X in the benzene ring;
  R is alkyl;

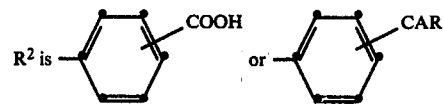

or can be taken together with R and the nitrogen atom to which it is attached to form a heterocyclic ring unsubstituted or substituted with a carboxy group; and
CAR is a carrier moiety which, as a function of oxidation under alkaline conditions, releases a diffusible dye, with the proviso that the compound contains at least one CAR group and, excepting when R and $R^2$ form a heterocyclic group and X is —SO$_2$—, must contain at least one carboxy group. The compounds are particularly useful in photographic elements and more particularly useful in image transfer film units.

22 Claims, No Drawings

COMPOUNDS WHICH RELEASE CYAN DYES OR DYE FORMING MATERIALS

This invention relates to photography and more particularly, to color diffusion transfer photography and image dye-providing compounds and dyes for use therein.

Color diffusion transfer processes generally involve the use of a photographic material comprising a support, at least one silver halide emulsion layer and image-providing material which is contained in or adjacent to said emulsion layer. Many image dye-providing materials have the structure CAR-Col, wherein Col is a colorant, such as a dye or a dye forming material, and CAR is an associated carrier or monitoring group which, as a function (positive or negative) of alkaline processing, releases the Col portion in diffusible form.

It is well known in the art to use image dyeproviding materials in a photographic element wherein an imagewise exposed material can be contacted with an alkaline processing solution to effect an imagewise difference in mobility of at least a portion of the dye-providing material, for example, to effect release of a dye or dye forming material. It is the particular carrier group which determines what form the dye release will take. For example, the release of diffusible dye can be accomplished by the cleavage of the carrier group from the dye by reaction with oxidized silver halide developing agent. (See, for example, the disclosure in U.S. Pat. No. 3,698,897, in British Specification No. 1,405,662 and in "Product Licensing Index," Volume 92, Item 9255, December 1971.)

Many dye or dye forming releasing materials used in image transfer processes, especially cyan dye and dye forming releasing materials, do not have good light and heat stability, good diffusion rate during processing and good spectral absorption characteristics.

Although some dye releasers show good properties with respect to one or two of these features, few exhibit good properties in all three areas.

U.S. Pat. No. 4,013,635 to Landholm et al describes redox dye or dye forming releasing compounds having a structure similar to the compounds of the present invention. However, the compounds of Landholm et al tend to be unstable when exposed to heat and moisture.

The present invention provides compounds and photographic elements containing compounds which release dyes or dye forming materials to form images of superior heat and light fastness and have sharp spectral absorption curves of good shape and narrow band width and which compounds provide images quickly after processing.

According to the present invention, a cyan dye-providing compound has the formula:

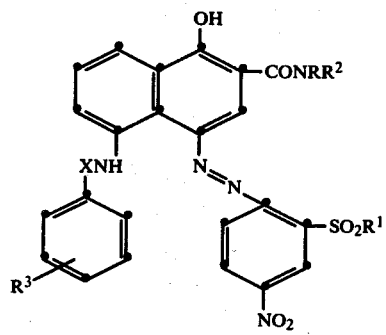

wherein:
R is alkyl, preferably containing from 1 to 6 carbon atoms such as methyl, ethyl, propyl, isopentyl, hexyl and including substituted alkyl such as chloromethyl and the like;

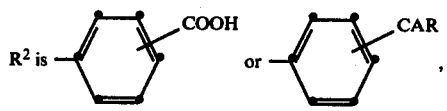

or can be taken together with R and the nitrogen atom to which it is attached to form a heterocyclic ring which is unsubstituted or substituted with a carboxy group. The preferred heterocyclic rings are 5–7 membered and include morpholine, piperazine, piperidine, pyrazolidine, imidazolidine, pyrrolidine and oxazolidine.

$R^1$ is selected from the group consisting of alkyl, preferably having from 1 to 6 carbon atoms as described for R; aryl, preferably containing from 6 to 10 carbon atoms such as phenyl, naphthyl and including substituted aryl such as tolyl and the like; $NR^{11}R^{12}$ wherein $R^{11}$ is alkyl, as described for $R^1$ or aryl, as described for $R^1$, and $R^{12}$ is alkyl, as described for $R^1$, such as diethylamino or $R^{11}$ and $R^{12}$, together with the nitrogen atom to which they are attached, is a heterocyclic ring, preferably having 5 to 7 members in the ring such as described for R and $R^2$ above, such as morpholine and the like;

X is —CO— or —SO$_2$—;

$R^3$ is —COOH or —CAR and is attached in the meta or para position to X in the benzene ring;

CAR is a carrier moiety which, as a function of oxidation under alkaline conditions, releases a diffusible dye.

The compound must contain at least one CAR group and, except when R and $R^2$ form a heterocyclic group and X is —SO$_2$, the compound must contain at least one carboxy group.

There is great latitude in selecting a CAR group which is attached to the azo dye-releasing compounds described above. Depending upon the nature of the ballasted carrier selected, various groups may be needed to attach or link the carrier moiety to the dye or dye forming moiety. Such linking groups are considered to be a part of the CAR moiety in the above definition. It should also be noted that when the dye or dye forming moiety is released from the compound, cleavage may take place in such a position that part or all of a linking group, if one is present, and even part of the ballasted moiety may be transferred to the image-receiving layer along with the dye.

CAR groups which may be used in the invention are described in U.S. Pat. Nos. 3,227,550; 3,628,952; 3,227,552; and 3,844,785 (dye released by chromogenic coupling); U.S. Pat. Nos. 3,443,939 and 3,443,940 (dye released by intramolecular ring closure); U.S. Pat. Nos. 3,698,896 and 3,725,062 (dye released from hydroquinone derivatives); U.S. Pat. No. 3,728,113 (dye released from a hydroquinonylmethyl quaternary salt); U.S. Pat. Nos. 3,719,489 and 3,443,941 (silver ion induced dye release); U.S. Pat. Nos. 3,245,789 and 3,980,479; Canadian Pat. No. 602,607; British Pat. No. 1,464,104; Research Disclosure 14447, April 1976; U.S. application Ser. No. 775,025, filed Mar. 7, 1977 of Chasman et al (dye released by miscellaneous mechanisms), and others, such as those described in German Patents DT 2,505,248 and DT 2,729,820, and U.S. Pat. No. 4,055,428, and U.S. patent application Ser. No. 832,048 of Fernandez et al.

In a further preferred embodiment of the invention, CAR may be represented by the following formula:

(Ballast-Carrier-Link) - wherein:

Ballast is an organic ballasting radical of such molecular size and configuration as to render the compound nondiffusible in a photographic element during development in an alkaline processing composition;

Carrier is an oxidizable acyclic, carbocyclic or heterocyclic moiety; and

Link represents a group which upon oxidation of Carrier is capable of being hydrolytically cleaved to release the diffusible dye. For example, Link may be the following groups:

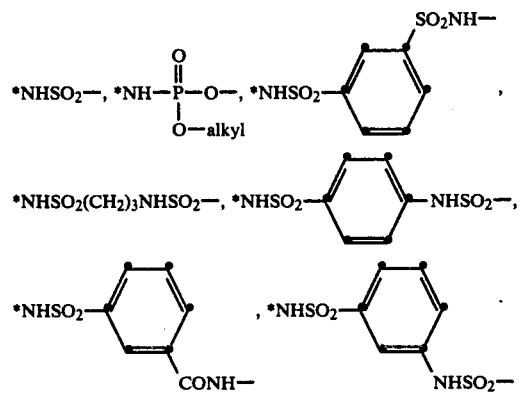

wherein

* represents the position of attachment to Carrier.

The Ballast group in the above formula is not critical as long as it confers nondiffusibility to the compound. Typical Ballast groups include long-chain alkyl radicals linked directly or indirectly, as well as aromatic radicals of the benzene and naphthalene series indirectly attached or fused directly to the carbocyclic or heterocyclic nucleus. Useful Ballast groups generally have at least 8 carbon atoms such as substituted or unsubstituted primary or secondary alkyl groups of 8 to 22 carbon atoms, a carbamoyl radical having 8 to 30 carbon atoms, e.g., $-CONH(CH_2)_4-O-C_6H_3(C_5H_{11})_2$ or $-CON(C_{12}H_{25})_2$, or a keto radical having 8 to 30 carbon atoms, e.g., $-CO-C_{17}H_{35}-CO-C_6H_4-(t-C_{12}H_{25})$ or a suphamoyl radical having 9 to 30 carbon atoms, e.g., $-SO_2NHC_{12}H_{25}$.

For specific examples of Ballast-Carrier-Link groups, reference is made to the November 1976 edition of Research Disclosure, pages 68 to 74, and the April 1977 edition of Research Disclosure, pages 32 to 39.

In a highly preferred embodiment of the invention, CAR is a group having the formula:

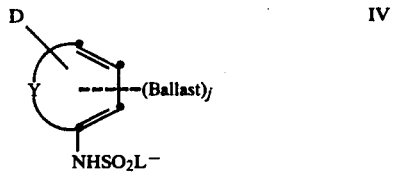

IV wherein:

Ballast is as defined above;

D, which i ortho or para to $-NHSO_2L-$, is $OR^4$ or $NHR^5$ wherein $R^4$ is hydrogen or a hydrolyzable group, and $R^5$ is hydrogen or a substituted or unsubstituted alkyl or cycloalkyl group of 1 to 22 carbon atoms, for example, methyl, ethyl, hydroxyethyl, propyl, butyl, secondary butyl, tert-butyl, cyclopropyl, 4-chlorobutyl, cyclobutyl, 4-nitroamyl, hexyl, cyclohexyl, octyl, decyl, octadecyl, dodecyl, benzyl or phenethyl. When $R^5$ is an alkyl or cycloalkyl group of greater than 8 carbon atoms, it can serve as a partial or sole Ballast;

Y represents the atoms necessary to complete a benzene or naphthalene nucleus, or a 5 to 7 membered heterocyclic ring, for example, pyrazolone or pyrimidine.

j is 1 or, when D provides Ballast, it may be 0; and

L is a linking group which is $[X-(NR^6-J)_q]_m-$ or $X-J-NR^6-$ wherein:

(i) X represents a bivalent linking group of the formula $-R^7-L'_n-R^7_{p}-$ where each $R^7$ can be the same or different and each represents an alkylene radical having 1 to about 8 carbon atoms; a phenylene radical; or a substituted phenylene radical having 6 to about 9 carbon atoms;

(ii) L' represents a bivalent radical selected from oxy, carbonyl, carboxamido, carbamoyl, sulfonamido, ureylene, sulfamoyl, sulfinyl or sulfonyl;

(iii) n is an integer of 0 or 1;

(iv) p is 1 when n equals 1 and p is 1 or 0 when n equals 0, provided that when p is 1 the carbon content of the sum of both $R^7$ radicals does not exceed 14 carbon atoms;

(v) $R^6$ represents a hydrogen atom, or an alkyl radical having 1 to about 6 carbon atoms;

(vi) J represents a bivalent radical selected from sulfonyl or carbonyl;

(vii) q represents an integer of 0 or 1; and (viii) m represents an integer of 0, 1 or 2.

When Y represents the atoms necessary to complete a naphthalene nucleus, Ballast may be attached to either ring thereof.

In addition to the ballast, the nucleus completed by Y may have groups or atoms attached thereto, such as halogen atoms, alkyl, aryl, alkoxy, aryloxy, nitro, amino, alkylamino, arylamino, amido, cyano, alkylmercapto, keto, carboalkoxy, and heterocyclic groups.

Especially good results are obtained in the above formula when D is OH, j is 1 and Y is a naphthalene nucleus.

Examples of the CAR in this preferred embodiment are disclosed in British Specification No. 1,405,662, U.S. Pat. No. 3,928,312; French Pat. No. 2,284,140; and German Patent Nos. 2,406,664; 2,613,055; and 2,505,248 and include the following:

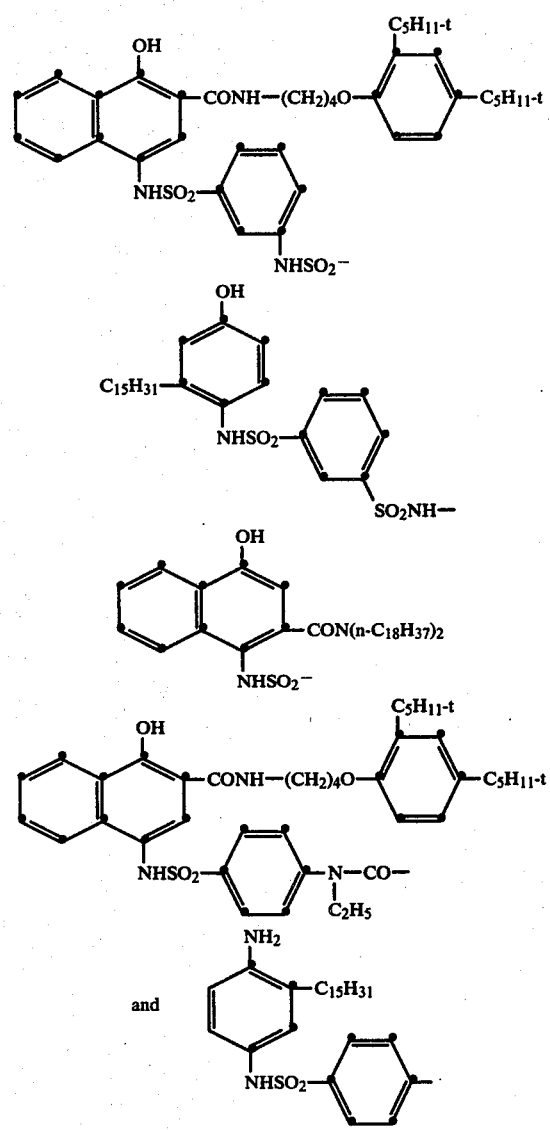

In other preferred embodiments of the invention CAR is such that, unlike CAR groups of formula IV, the diffusible dye is released as an inverse function of development of the silver halide emulsion layer under alkaline conditions. This is ordinarily referred to as positive-working dye-release chemistry. In one of these embodiments, CAR is a group having the formula:

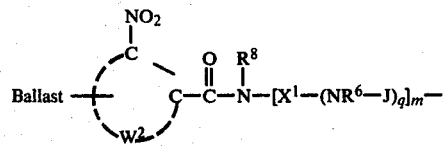

wherein:

Ballast is as defined above;

$W^2$ represents the atoms necessary to complete a benzene nucleus including any substituents thereon; and $R^8$ is an alkyl or substituted alkyl having 1 to 4 carbon atoms;

$X^1$ is an alkylene group of 1–4 carbon atoms;

$R^6$ is hydrogen or an alkyl group of 1 to 6 carbon atoms;

J is sulphonyl or carbonyl;

q is 0 or 1; and m is 0, 1 or 2.

Examples of CAR groups of formula V are the following:

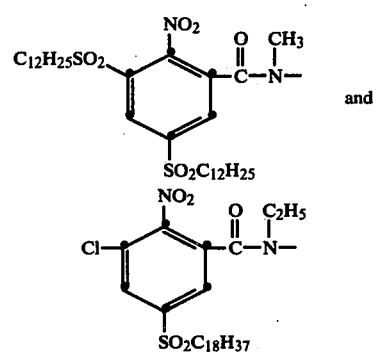

In a second preferred embodiment of positive-working dye-release chemistry CAR is a group having the formula:

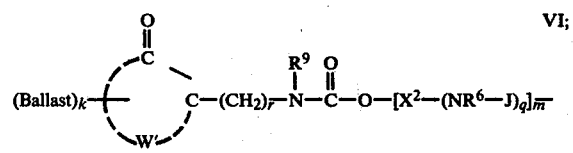

wherein:

Ballast is as defined above;

$W^1$ represents the atoms necessary to complete a quinone nucleus including any substituents thereon;

r is 0 or 1;

$R^9$ is an alkyl or substituted alkyl having 1 to 40 carbon atoms or an aryl or substituted aryl having 6 to 40 carbon atoms;

k is 1 or, when $R^9$ provides the Ballast, it may be 0;

$X^2$ is a phenylene or substituted phenylene group of 6–9 carbon atoms; and $R^6$, J, q and m are as defined above.

Examples of CAR groups of formula VI are the following:

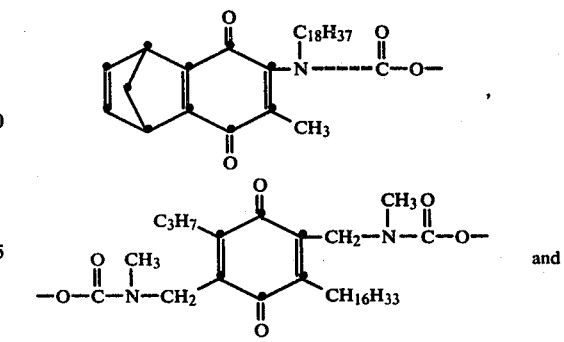

-continued

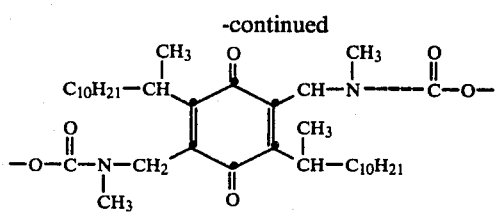

In use, the compounds of formulae V and VI are reduced as a function of silver halide development under alkaline conditions, and the diffusible dye or dye former is released. In such an embodiment, conventional negative-working silver halide emulsions, as well as direct-positive emulsions, can be employed. For further details concerning these particular CAR groups reference is made to U.S. application Ser. No. 775,025 of Chasman et al, filed Mar. 7, 1977.

In a third embodiment of positive-working dye-release chemistry as referred to above, CAR is a group having the formula:

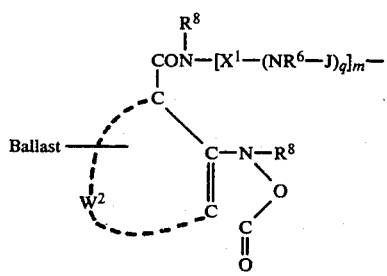

wherein:
Ballast, $W^2$, $R^8$, $X^1$, $R^6$, J, q and m are as defined above.

Examples of such CAR groups are the following:

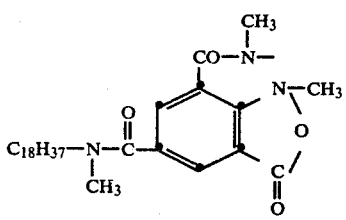

and

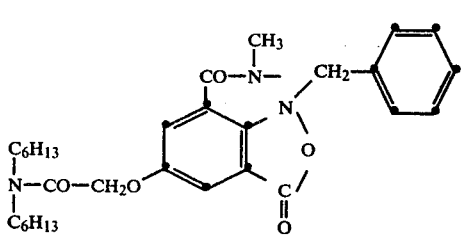

For further details concerning this particular CAR, including synthetic details, reference is made to British Specification No. 1,464,104.

In a fourth embodiment of positive-working dye-release chemistry CAR has the formula:

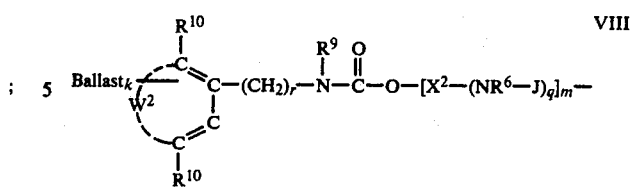

wherein:
Ballast, r, $R^9$, $X^2$, $R^6$, J, q and m are as defined above;
$W^2$ is as defined for formula V above; and
$R^{10}$ is OH or a hydrolyzable precursor thereof.

Examples of such CAR groups are the following:

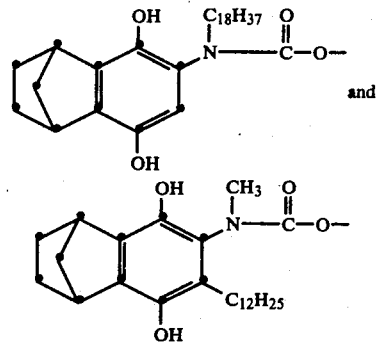

For further details concerning this particular CAR including synthetic details, reference is made to U.S. Pat. No. 3,980,479.

The present RDR compounds of formula I may be prepared by methods, in themselves, known to organic chemists.

Novel cyan dyes released can have the formula:

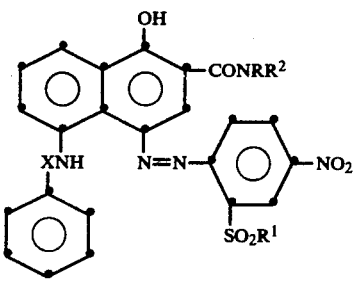

wherein:
$R^1$ is selected from the group consisting of aryl, alkyl, and $NR^{11}R^{12}$ wherein $R^{11}$ is alkyl or aryl and $R^{12}$ is alkyl, or $R^{11}$ and $R^{12}$, taken together with the nitrogen atom to which they are attached, is a heterocyclic ring;
X is —CO— or —SO₂—;
R is alkyl;

or
can be taken together with R and the nitrogen atom to which it is attached to form a heterocyclic ring, unsubstituted or substituted with a carboxy group. Preferred dyes are those wherein $R^1$ is alkyl, R is alkyl, $R^2$ is

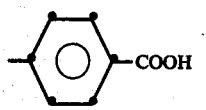

and X is $SO_2$.

Examples of compounds according to the present invention include those of the formula:

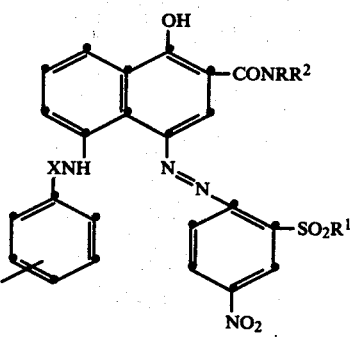

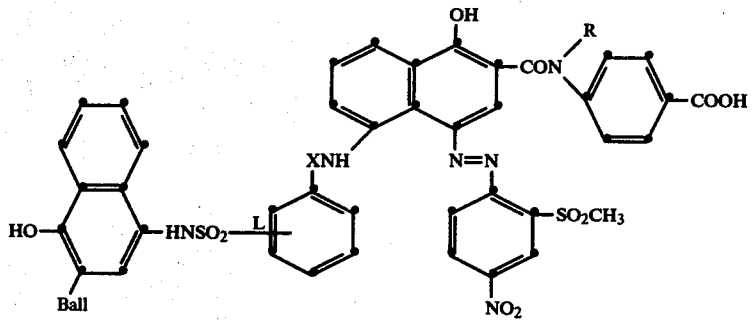

having the substituents specified below:

| Compound | R | L | X | Ball |
|---|---|---|---|---|
| A | $C_2H_5$ | meta | CO | —CONH(CH$_2$)$_4$O—⟨⟩—$C_5H_{11}t$ with $C_5H_{11}t$ |
| B | $C_2H_5$ | meta | CO | —CONHCH$_2$CH($C_2H_5$)O—⟨⟩—$C_{15}H_{31}$ |
| C | $C_2H_5$ | meta | CO | —CON($C_{18}H_{37}$)$_2$ |
| D | $C_2H_5$ | para | CO | —CONHCH$_2$CH($C_2H_5$)O—⟨⟩—$C_{15}H_{31}$ |
| E | $C_2H_5$ | para | CO | —CON($C_{18}H_{37}$)$_2$ |
| F | $CH_3$ | meta | $SO_2$ | —CONH(CH$_2$)$_4$O—⟨⟩—$C_5H_{11}t$ with $C_5H_{11}t$ |
| G | $C_2H_5$ | meta | $SO_2$ | —CON($C_{18}H_{37}$)$_2$ |
| H | $C_2H_5$ | para | $SO_2$ | —CON($C_{18}H_{37}$)$_2$ |

In another embodiment of this invention, there is provided a photographic element comprising a support having thereon at least one photosensitive silver halide emulsion layer, said emulsion layer having associated therewith a nondiffusible compound having the following formula:

wherein:

$R^1$ is selected from the group consisting of aryl, alkyl, $NR^{11}R^{12}$ wherein $R^{11}$ is alkyl or aryl and $R^{12}$ is alkyl, or $R^{11}$ and $R^{12}$, taken together with the nitrogen atom to which they are attached, is a heterocyclic group;

X is —CO— or —$SO_2$—;

$R^3$ is —COOH or —CAR and is attached in the meta or para position to X in the benzene ring;

R is alkyl;

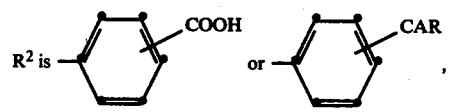

or can be taken together with R and the nitrogen atom to which it is attached to form a heterocyclic ring unsubstituted or substituted with a carboxy group; and CAR is a ballasted carrier moiety which, as a function of oxidation under alkaline conditions, releases a diffusible dye, with the proviso that the compound contains at least one CAR group and, excepting when R and $R^2$ form a heterocyclic group and X is —$SO_2$—, must contain at least one carboxy group.

The preferred photographic element according to the present invention comprises a support having thereon a red-sensitive silver halide emulsion layer having associated therewith a cyan or shifted cyan image dye-providing material, a green-sensitive silver halide emulsion layer having associated therewith a magenta or shifted magenta image dye-providing material, and a blue-sensitive silver halide emulsion layer having associated therewith a yellow or shifted yellow image dye-providing material, said cyan image dye-providing materials being compounds according to the present invention.

One process for producing a photographic transfer image, in color, using the photographic element of our invention comprises the steps of:

(1) treating the above-described imagewise exposed multilayer photosensitive element with an alkaline processing composition, in the presence of a silver halide developing agent, to effect development of the exposed silver halide emulsion layers, thereby oxidizing the developing agent and the oxidized developing agent, in turn, cross-oxidizing the dye image-forming compound;

(2) forming an imagewise distribution of diffusible released dye as a function of the imagewise exposure of each of the silver halide emulsion layers;

(3) diffusing to a dye image-receiving layer at least a portion of each of the imagewise distributions of diffusible released dye to provide an image; and (4) optionally separating the image-receiving layer containing the dye image from the photosensitive element.

The photosensitive element in the above-described process may be treated with an alkaline processing composition to effect or initiate development in any manner. A preferred method for applying processing composition is by use of a rupturable container or pod which contains the composition. In general, the processing composition employed in our system contains the developing agent for development, although the composition could also just be an alkaline solution, where the developer is incorporated in the photosensitive element. In this case, the alkaline solution serves to activate the incorporated developer.

The present invention further provides a photographic film unit which is adapted to be processed by passing the unit between a pair of juxtaposed pressure-applying members, comprising:

(1) a photosensitive element, as described above;

(2) a dye image-receiving layer; and (3) means for discharging an alkaline processing composition within the film unit;

the film unit containing a silver halide developing agent.

The dye image-receiving layer in the above-described film unit may be located on a separate support adapted to be superimposed on the photosensitive element after exposure thereof. Such image-receiving layers are generally disclosed, for example, in U.S. Pat. No. 3,362,819. When the means for discharging the processing composition is a rupturable container, typically it is positioned in relation to the photosensitive element and the image-receiving layer so that a compressive force applied to the container by pressure-applying members, such as found in a camera designed for in-camera processing, will effect a discharge of the contents of the container between the image-receiving layer and the outermost layer of the photosensitive element. After processing, the dye image-receiving layer is separated from the photosensitive element.

The dye image-receiving layer in the above-described film unit can also be located integral with the photosensitive silver halide emulsion layer. Useful formats for integral receiver-negative photosensitive elements are disclosed in British Specification No. 1,330,524. In one such embodiment, the support for the photosensitive element is transparent and is coated with an image-receiving layer, a substantially opaque light-reflective layer, e.g., $TiO_2$, and then the photosensitive layer or layers described above. There is preferably a transparent cover sheet located over the outermost layer from the support and it preferably has coated thereon, in sequence, a neutralizing layer and a timing layer. After exposure of the photosensitive element, a rupturable container containing an alkaline processing composition and an opaque process sheet are brought into superimposed position. Pressure-applying members in the camera rupture the container and spread processing composition over the photosensitive element as the film unit is withdrawn from the camera. The processing composition develops each exposed silver halide emulsion layer, and dye images are formed as a function of development, said dye diffusing to the image-receiving layer to provide a positive, right-reading image which is viewed through the transparent support on the opaque reflecting layer background.

Another format for integral negative-receiver photosensitive elements in which the present invention can be employed is also described in the above-mentioned British specification. In this embodiment, the support for the photosensitive element is transparent and is coated with the image-receiving layer, a substantially opaque, light-reflective layer and the photosensitive layer or layers described above. A rupturable container containing an alkaline processing composition and an opacifier is positioned adjacent to the top layer and a transparent top sheet. The film unit is placed in a camera, exposed through the transparent top sheet and then passed through a pair of pressure-applying members in the camera as it is being removed therefrom. The pressure-applying members rupture the container and spread processing composition and opacifier over the negative portion of the film unit to render it light-insensitive. The processing composition develops each silver halide layer and dye images are formed as a result of development, said dye diffusing to the image-receiving layer to provide a right-reading image that is viewed through the transparent support on the opaque reflecting layer background.

A further integral format comprises a film unit wherein the support is opaque and said dye image-receiving layer is located on a separate transparent support superimposed over the layer outermost from said opaque support. Preferably, such a film unit is one wherein the transparent support has thereon, in sequence, a neutralizing layer, a timing layer and the dye image-receiving layer.

Still other useful integral formats in which our compounds can be employed are described in U.S. Pat. Nos. 3,415,644; 3,415,645; 3,415,646; 3,647,437 and 3,635,707.

The film unit or assembly of the present invention can be used to produce positive images in single- or multi-colors. In a three-color system, each silver halide emulsion layer of the film assembly will have associated therewith an image dye-providing material possessing a predominant spectral absorption within the region of the visible spectrum to which said silver halide emulsion is sensitive, i.e., the blue-sensitive silver halide emulsion layer will have a yellow image dye-providing material associated therewith, the green-sensitive silver halide emulsion layer will have a magenta image dye-providing material associated therewith, and the red-sensitive silver halide emulsion layer will have a cyan image dye-providing material associated therewith. The image dye-providing material associated with each silver halide emulsion layer can be contained either in the silver halide emulsion layer itself, or in a layer contiguous to the silver halide emulsion layer.

It will be appreciated that, after processing the photographic element described above, there remains in it, after transfer has taken place, an imagewise distribution of dye or dye forming material, in addition to developed silver. A color image comprising residual nondiffusible compound may be obtained in this element if the residual silver and silver halide are removed by any conventional manner, such as a bleach bath, followed by a fix bath or by a bleach-fix bath.

The imagewise distribution of dye or dye forming material may also diffuse out of the element into these baths, if desired, rather than to an image-receiving element. If a negative-working silver halide emulsion is employed in certain preferred photosensitive elements, described above, then a positive color image, such as a reflection print, a color transparency or motion picture film, may be produced in this manner. If a direct-positive silver halide emulsion is employed in such photosensitive elements, then a negative color image may be produced.

The concentration of the present compounds, as employed in the present invention, can be varied over a wide range, depending upon the particular compound employed and the results which are desired. For example, the image dye-providing compounds of the present invention may be coated in layers as dispersions in a hydrophilic film-forming natural or synthetic polymer, such as gelatin or polyvinyl alcohol, which is adapted to be permeated by aqueous alkaline processing composition. Preferably, the ratio of dye-providing compound to polymer will be from 0.25:1 to 4.0:1. The coated layers may contain 0.1 to 2.0 grams dye-releasing compound per square meter. The present compounds may be incorporated in gelatin by techniques known in the art (e.g., in a high-boiling, water-immiscible organic solvent and/or a low-boiling or water-immiscible organic solvent).

Depending upon which CAR is used on the present compounds, a variety of silver halide developing agents can be employed in our invention. If the CAR used is that of Formula IV, any silver halide developing agent may be used, as long as it cross-oxidizes with the image dye-providing compounds used herein. The developer may be employed in the photosensitive element to be activated by the alkaline processing composition. Specific examples of developing agents which may be employed are hydroquinone, aminophenols, e.g., N-methylaminophenol, Phenidone (1-phenyl-3-pyrazolidone), a trademark of Ilford, Ltd; Dimezone (1-phenyl-4,4-dimethyl-3-pyrazolidone); 1-phenyl-4-methyl-4-hydroxymethyl-3-pyrazolidone; N,N-diethyl-p-phenylene-diamine; 3-methyl-N,N-diethyl-p-phenylenediamine and 3-methoxy-N,N-diethyl-p-phenylenediamine. The black-and-white developers in this list are preferred, in that they have a reduced propensity to stain the dye image-receiving layer.

In one preferred embodiment of our invention, the silver halide developer in our process becomes oxidized upon development and reduces silver halide to silver metal. The oxidized developer then cross-oxidizes the dye-releasing compound. The product of cross-oxidation then undergoes alkaline hydrolysis, thus releasing an imagewise distribution of diffusible dye, which then diffuses to the receiving layer to provide the dye image. The diffusible moiety is transferable in alkaline processing composition, either by virtue of its self-diffusivity or by having attached to it one or more solubilizing groups, for example, a carboxy, sulpho, sulphonamido, hydroxy or morpholino group.

In using dye-releasing compounds, according to our invention, which are negative-working, either negative or direct-positive silver halide emulsion layers may be used. If the silver halide emulsion employed forms a direct-positive silver image, such as a direct-positive internal-image emulsion or a solarizing emulsion, a positive image can be obtained on the dye image-receiving layer. After exposure of the film unit, the alkaline processing composition permeates the various layers to initiate development in the unexposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then cross-oxidizes the dye-releasing compounds and the oxidized form of the compounds then undergoes a base-catalyzed reaction in a preferred embodiment of our invention, to release the dyes imagewise as a function of the imagewise exposure of each of the silver halide emulsion layers. At least a portion of the imagewise distributions of diffusible dyes diffuse to the image-receiving layer to form a positive image of the original subject. After being contacted by the alkaline processing composition, a pH-lowering layer lowers the pH of the film unit or the image-receiving unit to stabilize the image.

Internal image silver halide emulsions useful in direct-positive emulsions that form latent images predominantly inside the silver halide grains are described by Davey et al, U.S. Pat. No. 2,592,250 and elsewhere in the literature. Other useful emulsions are described in U.S. Pat. No. 3,761,276, issued Sept. 25, 1973.

The internal image silver halide emulsions, when processed in the presence of fogging or nucleating agents, provide direct-positive silver images. Examples of such fogging agents include the hydrazines described in U.S. Pat. Nos. 2,588,982 and 2,563,785; the hydrazides and hydrazones described in U.S. Pat. No. 3,227,552; hydrazone quaternary salts described in U.S. Pat. No. 3,615,615 and hydrazone-containing polymethine dyes described in U.S. Pat. No. 3,718,470 or mixtures thereof.

Other direct-positive silver halide emulsions useful in the above-described embodiment are silver halide emulsions which have been fogged either chemically, such as by the use of reducing agents, or by radiation to a point which corresponds approximately to the maximum density of the reversal curve, as shown by Mees, *The Theory of the Photographic Process*, published by the Macmillan Company, New York, New York, 1942, pages 261 through 297. Typical methods for the preparation of such emulsions are described in U.S. Pat. Nos. 3,367,778; 3,501,305; 3,501,306 and 3,501,307.

Other embodiments in which our imaging chemistry can be employed include the techniques described in U.S. Pat. Nos. 3,227,550; 3,227,551; 3,227,552 and 3,364,022.

Negative silver halide emulsions useful in certain embodiments of this invention may comprise, for example, silver chloride, silver bromide, silver chlorobromide, silver bromoiodide, silver chlorobromoiodide or mixtures thereof. The emulsions can be coarse- or fine-grained and can be prepared by any of the well-known procedures, e.g., single-jet emulsions, such as those described in Trivelli and Smith, *The Photographic Journal*, Volume LXXIX, May 1939 (pages 330 through 338), double-jet emulsions, such as Lippmann emulsions, ammoniacal emulsions, thiocyanate or thioether ripened emulsions, such as those described in U.S. Pat. Nos. 2,222,264; 3,320,069 and 3,574,628. The emulsions can be monodispersed regular-grain emulsions, such as the type described in Klein and Moisar, *J. Phot. Sci.,* Volume 12, No. 5, September/October 1964 (pages 242 through 251).

Another embodiment of our invention uses the image-reversing technique disclosed in British Patent No. 904,364, page 19, lines 1 through 41. In this system, our dye-providing compounds are used in combination with physical development nuclei in a nuclei layer contiguous to the photosensitive silver halide negative emulsion layer. The film unit contains a silver halide solvent, preferably in a rupturable container with the alkaline processing composition.

The various silver halide emulsion layers of a color film assembly of the invention can be disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion.

The rupturable container employed in the integral film units of this invention may be of the type disclosed in U.S. Pat. Nos. 2,543,181; 2,643,886; 2,653,732; 2,724,051; 3,056,492; 3,056,491 and 3,152,515.

In a color film unit according to this invention, each silver halide emulsion layer containing a dye image-providing material or having the dye image-providing material present in a contiguous layer can be separated from the other silver halide emulsion layers in the image-forming portion of the film unit by materials including gelatin, calcium alginate, or any of those disclosed in U.S. Pat. No. 3,384,483, polymeric materials such as polyvinylamides which are disclosed in U.S. Pat. No. 3,421,892 or any of those disclosed in French Patent No. 2,028,236 or U.S. Pat. Nos. 2,992,104; 3,043,692; 3,044,873; 3,061,428; 3,069,263; 3,069,264; 3,121,011 and 3,427,158.

Generally, except where noted otherwise, the silver halide emulsion layers in the invention comprise photosensitive silver halide dispersed in gelatin and are about 0.6 to 6 microns in thickness; the dye image-providing materials are dispersed in an aqueous alkaline solution-permeable polymeric binder, such as gelatin, as a separate layer about 1 to 7 microns in thickness; and the alkaline solution-permeable polymeric interlayers, e.g., gelatin, are about 1 to 5 microns in thickness. Of course, these thicknesses are approximate only and can be modified according to the product desired.

Any material can be employed as the image-receiving layer in this invention, as long as the desired functions of mordanting or otherwise fixing the dye images will be obtained. The particular material chosen will, of course, depend upon the dye to be mordanted. The mordants may be basic polymeric mordants, such as polymers of amino guanidine derivatives of vinyl methyl ketone, such as described in U.S. Pat. No. 2,882,156, and basic polymeric mordants, such as described in U.S. Pat. Nos. 3,625,694; 3,709,690 and 3,898,088. See also U.S. Pat. Nos. 3,958,995 and 3,859,096, and pages 80 through 82 of the November 1976 edition of *Research Disclosure.*

Generally, good results are obtained when the image-receiving layer, preferably alkaline solution-permeable, is transparent and is from 0.25 to 0.40 mil in thickness. This thickness can be modified, depending upon the result desired. The image-receiving layer can also contain ultraviolet absorbing materials to protect the mordanted dye images from fading due to ultraviolet light, brightening agents such as the stilbenes, coumarins, triazines, oxazoles and dye stabilizers, such as the chromanols and alkylphenols.

Use of a pH-lowering material in the dye image-receiving part of a film unit according to the invention will usually increase the stability of the transferred image. Generally, the pH-lowering material will effect a reduction in the pH of the image layer to 4 to 8 within a short time after imbibition. For example, polymeric acids as disclosed in U.S. Pat. No. 3,362,819, or solid acids or metallic salts, e.g., zinc acetate, zinc sulphate or magnesium acetate, as disclosed in U.S. Pat. No. 2,584,030, may be employed with good results. Such pH-lowering materials reduce the pH of the film unit after development to terminate development and substantially reduce further dye transfer and thus stabilize the dye image.

An inert timing or spacer layer may be employed, in the practice of our invention, over the pH-lowering layer which "times" or controls the pH reduction as a function of the rate at which alkali diffuses through the inert spacer layer. Examples of such timing layers include gelatin, polyvinyl alcohol or any of those disclosed in U.S. Pat. No. 3,455,686. The timing layer can be effective in evening out the various reaction rates over a wide range of temperatures, e.g., premature pH reduction is prevented when imbibition is effected at temperatures above room temperature, for example, at 35° to 38° C. The timing layer is usually 0.1 to 0.7 mil in thickness. Especially good results are obtained when the timing layer comprises a hydrolyzable polymer or a mixture of such polymers which are slowly hydrolyzed by the processing composition. Examples of such hydrolyzable polymers include polyvinyl acetate, polyamides and cellulose esters.

The alkaline processing composition employed in this invention is the conventional aqueous solution of an alkaline material, e.g., sodium hydroxide, sodium carbonate or an amine such as diethylamine, preferably having a pH in excess of 10, and preferably containing a developing agent as described previously. The solution may also contain a viscosity-increasing compound, such as a high-molecular-weight polymer, e.g., a water-soluble ether inert to alkaline solutions, such as hydroxyethyl cellulose or alkali metal salts of carboxymethyl cellulose, such as sodium carboxymethyl cellulose. A concentration of viscosity-increasing compound of from 1 to 5 percent by weight of the processing composition is preferred which will impart thereto a viscosity of from 100 cp. to 200,000 cp. In certain embodiments of our invention, an opacifying agent, e.g., $TiO_2$, carbon black and/or pH indicator dyes, may be added to the processing composition.

While the alkaline processing composition used in this invention can be employed in a rupturable container, as described previously, to conveniently facilitate the introduction of processing composition into a film unit, other methods of inserting processing composition into the film unit could also be employed, e.g., interjecting processing solution with communicating members similar to hypodermic syringes which are attached either to a camera or camera cartridge.

The alkaline solution-permeable, substantially opaque, light-reflective layer employed in certain embodiments of photographic film units of our invention can generally comprise any opacifier dispersed in a binder, as long as it has the desired properties. Particularly desirable are white light-reflective layers, since they would be aesthetically pleasing backgrounds on which to view a transferred dye image and would also possess the optical properties desired for reflection of incident radiation. The preferred opacifying agent is titanium dioxide. It can be dispersed in gelatin or polyvinyl alcohol. Brightening agents, such as the stilbenes, coumarins, triazines and oxazoles may also be added to the light-reflective layer, if desired. When it is desired to increase the opacifying capacity of the light-reflective layer, dark-colored opacifying agents, e.g., carbon black or nigrosine dyes, may be coated in a separate layer adjacent to the light-reflective layer.

The supports for the photosensitive elements and image-receiving elements can consist of flexible sheet materials, including cellulose nitrate film, cellulose acetate film, poly(vinyl acetal) film, polystyrene film, poly(ethylene terephthalate) film, polycarbonate film, poly-α-olefins, such as polyethylene and polypropylene film, related films or resinous materials or paper preferably coated with a poly-α-olefin. The support can be from 2 to 9 mils in thickness.

The silver halide emulsions and associated technology useful in our invention are well known to those skilled in the art, and are described in *Product Licensing Index*, Volume 92, December 1971, publication 9232.

The term "nondiffusible" as used herein has the meaning commonly applied to the term in photography and denotes materials that, for all practical purposes, do not migrate nor wander through organic colloid layers, such as gelatin, in an alkaline medium in the photographic elements of the invention, and preferably when processed in a medium having a pH of 10 or greater. The term "diffusible" has the converse meaning and denotes materials having the property of diffusing effectively through the colloid layers of the photographic elements in an alkaline medium.

The term "associated therewith", as used herein, is intended to mean that the materials can be in either the same or adjacent layers, so long as the materials are accessible to one another.

The following examples are included for a better understanding of the invention. All temperatures are given in °C.

EXAMPLE 1

4-{5-[[3-[3-(2,4-Di-t-pentylphenoxytetramethylenecarbamoyl)-4-hydroxy-1-naphthylsulphamoyl]benzamido]]-1-hydroxy-4-(2-mesyl-4-nitrophenylazo)-2-N-ethylnaphthamido}benzoic acid (16)

The above compound was prepared following the reaction sequence:

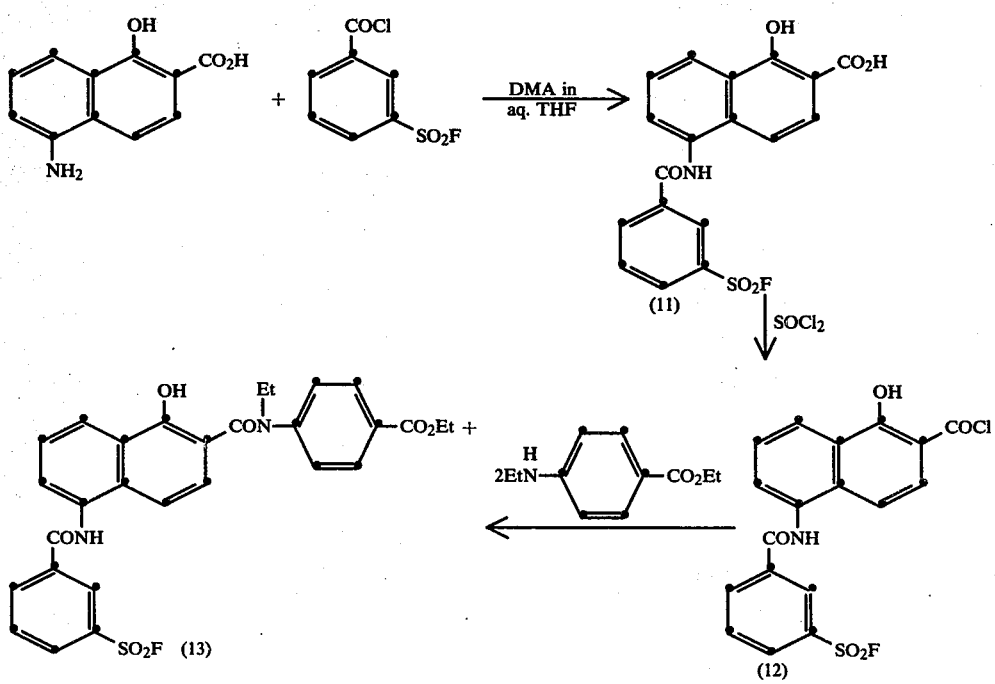

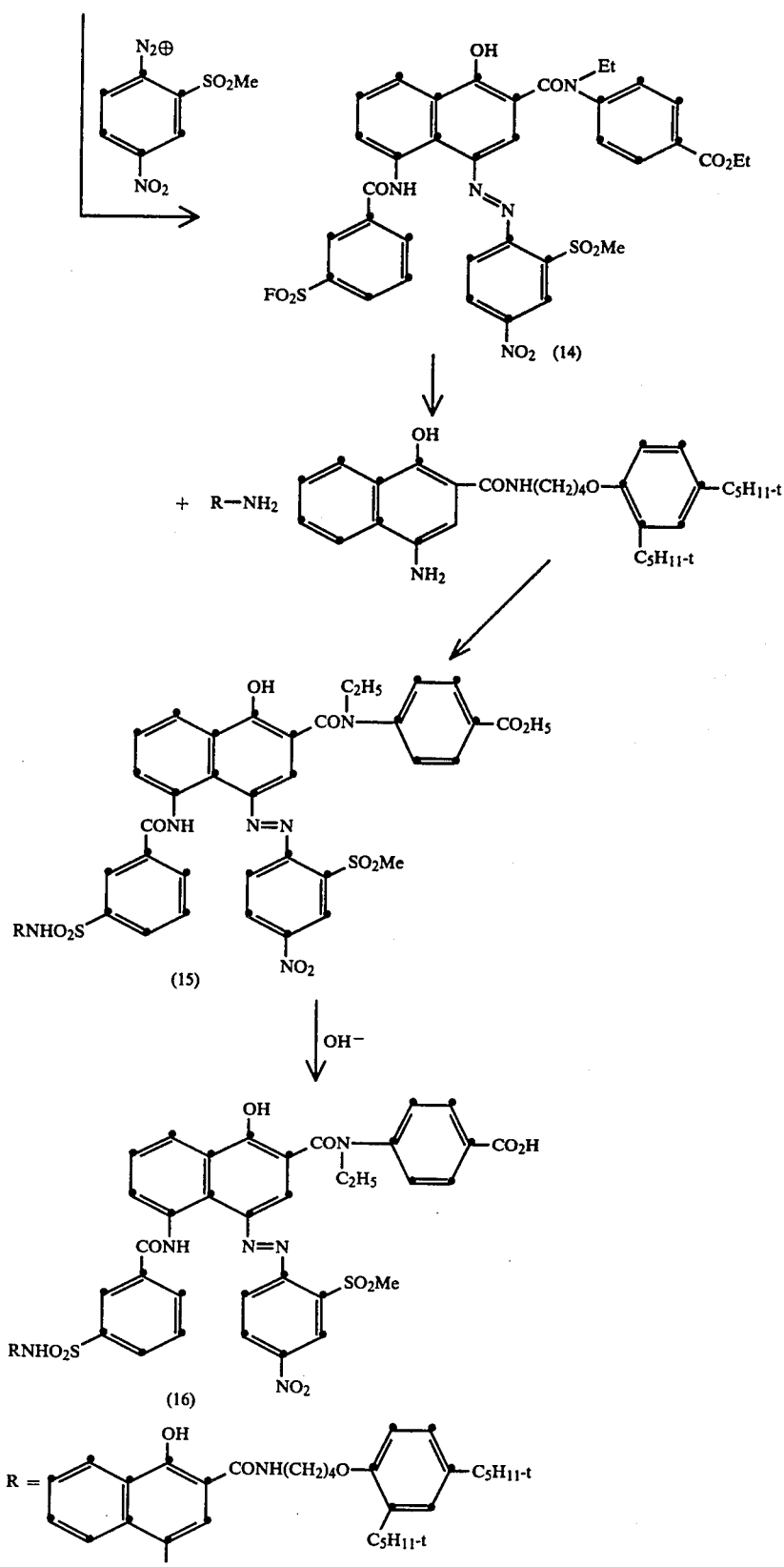
The following describes the preparation of the various intermediates:

5-Amino-1-hydroxy-2-naphthoic acid (19 g, 94 m.mole) was suspended in tetrahydrofuran (700 ml) and dimethylaniline (34 g, 280 m.mole). Water was added portionwise with stirring until a solution occurred.

3-Fluorosulphonylbenzoyl chloride (22 g, 98 m.mole) was added portionwise (10 minutes) to the aqueous tetrahydrofuran solution.

After 30 minutes, TLC analysis indicated a small proportion of unreacted 5-amino-1-hydroxy-2-naphthoic acid. Another portion of the acid chloride (0.5 g) was added. After 5 minutes, the tetrahydrofuran solution was poured into 1 N hydrochloric acid (2 liters) with stirring. The product was removed by filtration, washed with water and recrystallized from aqueous dimethylformamide.

Yield: 30 g (82 percent), m.p. 240° C. (dec.).

5-(3-Fluorosulphonylbenzamido)-1-hydroxy-2-naphthoyl chloride (12)

5-(3-Fluorosulphonylbenzamido)-1-hydroxy-2-naphthoic acid (11) (10 g, 26 m.mole) was suspended in dry dichloromethane (200 ml), containing dimethylformamide (0.5 ml) and thionyl chloride (10.8 g, 91 m.mole). The mixture was heated under reflux with stirring for 2.5 hours, during which time the required acid chloride had crystallized as a pale yellow solid. After cooling to 5° C., the acid chloride was removed by filtration and washed with a little cold, dry dichloromethane.

Ethyl 4-[5-(3-fluorosulphonylbenzamido)-1-hydroxy-2-N-ethylnaphthamido]benzoate (13)

Ethyl 4-ethylaminobenzoate (14.5 g, 75 m.mole) was dissolved in dry tetrahydrofuran (150 ml). The acid chloride (12) (12.0 g, 29 m.mole) was slurried with dry tetrahydrofuran (50 ml) and added rapidly with stirring to the amine solution at room temperature. After 30 minutes, the mixture was poured into 1 N hydrochloric acid (500 ml) and the oily product extracted into ethyl acetate. The latter was dried (anhydrous MgSO$_4$) and evaporated to yield a gum. This was crystallized from methanol to yield the required product as colorless plates.

Yield: 11.3 g (69 percent), m.p. 135° C.

Ethyl 4-[5-(3-fluorosulphonylbenzamido)-1-hydroxy-4-(2-mesyl-4-nitrophenylazo)-2-N-ethylnaphthamido]benzoate (14)

Sodium nitrite (2.0 g, 29 m.mole) was added portionwise with vigorous stirring to cold concentrated sulphuric acid (15 ml), and the mixture warmed to 70° C. to form a solution. 2-Mesyl-4-nitroaniline (4.8 g, 22 m.mole) was added portionwise with stirring to the sulphuric acid mixture at room temperature. When a clear solution was obtained, the sulphuric acid mixture was added dropwise to 1:4 propionic acid/acetic acid (45 ml) with stirring at 0° to 10° C. The mixture was stirred at room temperature until diazotization was complete (2 hours). Urea (0.5 g) was then added to decompose excess nitrous acid.

The coupler (13 g, 19.5 m.mole) was dissolved in the minimum quantity of dimethylformamide and acetic acid (50 ml) added. The coupler solution was cooled to <10° C.

The diazonium salt solution was added dropwise to the coupler solution at <10° C. with stirring. The mixture was stirred overnight at room temperature, during which time the dye began to crystallize. Acetic acid (50 ml) was added and the stirring continued for a further 2 hours. The dye (14) was removed by filtration, washed with acetic acid and recrystallized in acetic acid.

Yield: 11.4 g (74 percent), m.p. 259° to 260° C.

Ethyl 4-{5-[[3-[3-(2,4-di-t-pentylphenoxytetramethylenecarbamoyl)-4-hydroxy-1-naphthylsulphamoyl]benzamido]]-1-hydroxy-4-(2-mesyl-4-nitrophenylazo)-2-N-ethylnaphthamido}-benzoate (15)

The dye (14) and sodium bicarbonate (6.2 g, 74 m.mole) were suspended in dry degassed dimethylsulphoxide (60 ml) and placed in an oil bath at 105° to 110° C. R-NH$_2$; 4-Amino-N-[(2,4-di-tert.-pentylphenoxy)tetramethylene]-1-hydroxy-2-naphthamide (6.2 g, 12.7 m.mole) was added in one batch and the sides of the vessel washed down with degassed dimethylsulphoxide. The reaction was monitored by TLC and, when all of the starting dye had reacted (1 hour), the mixture was cooled and poured into 1 N hydrochloric acid (400 ml). The product (15) was removed by filtration, washed thoroughly with water and air dried.

The TLC analysis of the product showed, as impurities, a small amount of carrier and a minute quantity of base or alkaline material. The product was purified by wet column chromatography, using fluorisil (400 g) and 5 percent acetic acid in ethyl acetate as the eluent.

Yield: 10.5 g (68 percent).

The compound of the invention was prepared as follows:

Product RDR (16)

The RDR ester (15) (9.5 g, 7.5 m.mole) was first dissolved in degassed dimethylformamide (200 ml) and degassed methanol (100 ml) was added. Degassed 10 percent potassium hydroxide in methanol (100 ml) and degassed water (50 ml) were added, and the mixture stirred under nitrogen for 2 hours. The course of the hydrolysis was monitored by TLC. When reaction was complete, the mixture was poured into 1 N hydrochloric acid (1.5 liters). The RDR (16) was removed by filtration, washed thoroughly with water and air dried. Crystallization was effected in acetic acid.

Yield: 6.1 g (66 percent).

EXAMPLE 2

4-{5-[4-(3-Dioctadecylcarbamoyl-4-hydroxynaphth-1-ylsulphamoyl)benzenesulphonamido]-1-hydroxy-4-(2-mesyl-4-nitrophenylazo)-2-N-ethylnaphthamido}benzoic acid (21)

The above compound was formed by the general sequence of reactions:

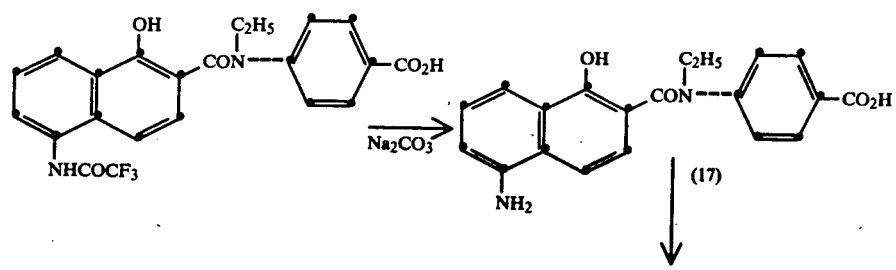
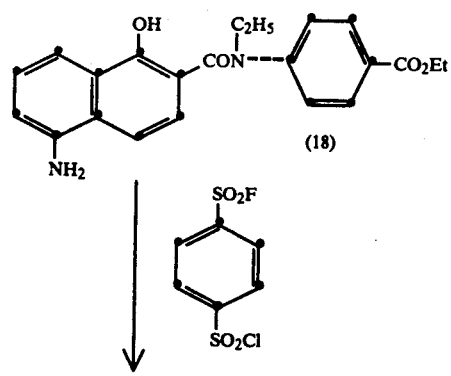
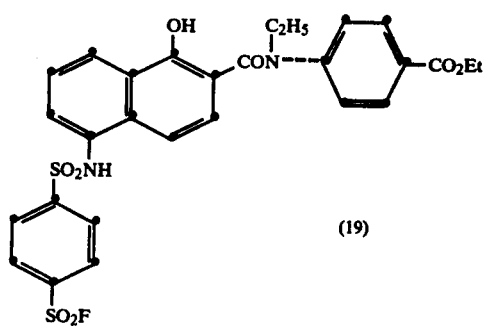
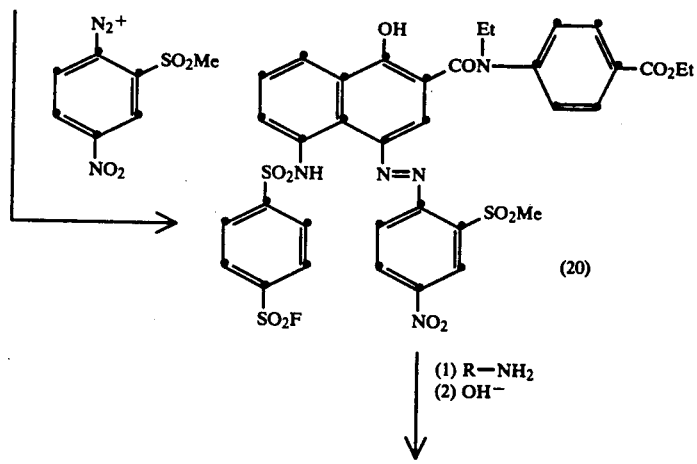

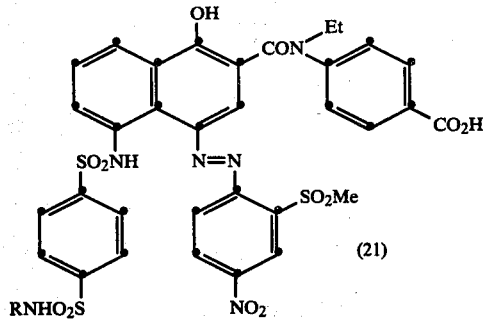

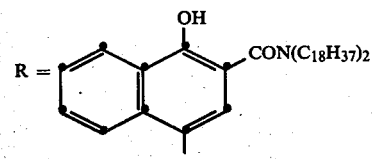

The intermediates were prepared as follows:

4-(5-Amino-1-hydroxy-2-N-ethylnaphthamide)benzoic acid (17)

The trifluoroacetamido compound (1.4 g) and 3 N sodium carbonate solution (5 ml) were heated on a steambath for 15 minutes. The solution was diluted with water (100 ml) and poured onto ice and glacial acetic acid (1 ml). The precipitate was filtered off, washed with water and dried to give 1.0 g of pure compound.

Ethyl 4-(5-amino-1-hydroxy-2-N-ethylnaphthamido)benzoate (18)

Concentrated sulphuric acid (10 ml) and ethanol (50 ml) were mixed with ice-cooling. The cold solution was added to an ice-cold suspension of 4-[N-(5-amino-1-hydroxy-naphth-2-oyl)-N-ethyl] aminobenzoic acid (17) (11.4 g) in ethanol (50 ml) and the mixture was heated under reflux for 7 hours. The solution was allowed to stand overnight at room temperature and was poured into a mixture of ice and sodium bicarbonate solution (60 g in 1000 ml of water). The solid was filtered off, washed with 5 percent sodium bicarbonate solution and was dried at 100° C., weight 11.5 g. The compound was used in the next stage without further purification, m.p. 134° to 135° C.

Ethyl 4-[5-(4-fluorosulphonylbenzenesulphonamido)-1-hydroxy-2-N-ethylnaphthamido]benzoate (19)

Under a stream of nitrogen, p-chlorosulphonylbenzenesulphonyl fluoride (10.2 g) in tetrahydrofuran (40 ml) was added to a stirred solution of the amine (18) (11.5 g) in THF (140 ml) containing dimethylaniline (4.8 g) and water (14 ml). The solution was stirred at room temperature for 17 hours, then poured into ice/HCl mixture and diluted to 2.5 liters with water. The solid was filtered off, washed with water and dried at 100° C., 17.4 g. Recrystallization from glacial acetic acid gave 12.5 g of pure compound.

Ethyl 4-[5-(4-fluorosulphonylbenzamido)-1-hydroxy-4-(mesyl-4-nitrophenylazo)-2-N-ethylnaphthamido]benzoate (20)

A stock of diazonium salt solution was prepared as follows:

Sodium nitrite (2.76 g, 40 m.mole) was added portionwise to stirred ice-cold concentrated sulphuric acid (25 ml). The mixture was heated to 70° C. to attain solution. 2-Methanesulphonyl-4-nitroaniline (6.5 g, 30 m.mole) was added portionwise to the propionic/acetic acids (1:5) (80 ml) at 8° C. with stirring. The mixture was stirred at room temperature for 1.5 hours.

The coupler (196.9 g, 12.4 m.mole) was dissolved in tetrahydrofuran (200 ml) and a solution of sodium acetate (80 g) in water (200 ml) added to give a two-phase system. The mixture was cooled to 5° C. with vigorous stirring, and the portionwise addition of diazonium salt solution commenced. About one-third of the stock solution was added rapidly.

Addition of diazonium salt solution was halted when TLC analysis indicated complete absence of coupler. The mixture was poured into dilute hydrochloric acid (3 liters) and the crude dye filtered and washed well with water. The dye was then stirred with hot acetic acid (200 ml) for 1 hour and cooled.

Filtration yielded analytically pure product.

Yield: 7.0 g (72 percent), m.p. 225° to 226° C.

The compound of Example 2 was prepared as follows:

Product RDR (21)

Sodium bicarbonate (15 g, 180 m.mole) was added to dry deoxygenated dimethylsulphoxide (150 ml) under $N_2$ in an oil bath at 115° C. The amino compound (4-amino-1-hydroxy-N-dioctadecyl-2-naphthamide) (22.6 g, 30 m.mole) was added with stirring, followed after 10 minutes by the reactive dye (20) (25 g, 30 m.mole). Reaction was complete in 30 minutes. The mixture was cooled and poured into dilute hydrochloric acid (2 liters). The crude RDR-ester intermediate was removed by filtration, washed with water and dried.

Crude yield 42 g.

Half of the crude RDR-ester intermediate (21 g) was dissolved in deoxygenated dimethylformamide (300 ml)

and methanol (150 ml) added. 10 percent potassium hydroxide in methanol (200 ml) was added, followed by water (100 to 150 ml). The mixture was stirred under $N_2$ for 3 hours, and then poured into dilute hydrochloric acid (3 liters). The crude product was collected by filtration, washed with water and dried. The RDR was then dissolved in ethyl acetate (1000 ml) and extracted with sodium bicarbonate solution to remove sulphonic acid impurities. The organic phase was dried and evaporated. Final purification was achieved using wet fluorisil column chromatography. The crude RDR was dissolved in the minimum amount of a mixture of 50/50 ethyl acetate/tetrahydrofuran containing 1 percent of acetic acid, and introduced to the column. The same solvent mix was used for eluting.

The pure RDR fractions were collected together and evaporated. The residue was recrystallized from acetic acid. The RDR (21) was collected by filtration, washed with water and dried. A final slurry with petroleum ether was needed to eliminate a trace of carrier impurity.

Yield of pure RDR (21) 10.6 g (48 percent based on half of the starting reactive dye [20]).

EXAMPLES 3 THROUGH 12

The RDR compounds of Examples 1 and 2 will, in use, release diffusible dyes thus:

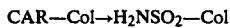

CAR—Col→$H_2NSO_2$—Col wherein CAR is a ballasted carrier, as defined earlier, and Col is the dye radical forming the remainder of the RDR.

The properties of such released dyes, together with other dyes released by RDR compounds according to the present invention prepared in similar ways, were evaluated and are listed in Table I below. Dye A is released by the RDR compound of Example 13 of British Specification No. 1,458,471 and represents prior art.

The cyan RDRs tested were evaluated by the following procedure.

RDR dispersions were prepared in $1.1 \times 10^{-3}$ mole batches.

$1.1 \times 10^{-3}$ mole of the cyan RDR was dissolved in 5.36 g of solvent[cyclohexanone/dimethylformamide/diethyl lauramide in parts by weight 20/3/6] and dispersed in 9.43 g of gelatin solution containing gelatin, diisopropylnaphthalene sulfonate, sodium salt solution (10 g/100 ml $H_2O$), and water in parts by weight 40/6/6. The dispersion was homogenized using ultrasonics, set, then noodle-washed for 6 hours using water adjusted to pH 6.0 with propionic acid and chilled to 4° C.

Polyethylene terephthalate base was precoated with a silver chlorobromide emulsion chemically sensitized to an optimum level. The RDR emulsion was coated on top followed by a supercoat of gelatin. The following coating weights were used:

| Emulsion layer: | Silver ~ | 10.8 mg/dm² |
| --- | --- | --- |
|  | gel | 16.1 mg/dm² |
| RDR layer: | RDR | 5.4 × 10⁻⁶ moles/dm² |
|  | gel | 27.7 mg/dm² |
| Supercoat: | gel | 8.1 mg/dm² |

The donor sheet was then exposed through the base.

The receiver comprised mordant I, mordant II or mordant III (32.3 mg/dm²) hardened with 1,4-butanediol-di-glycidyl ether (3.23 mg/dm²).

After exposure, the donor was soaked for 30 seconds in a developer at 22.8° C., then laminated for 2 minutes with the receiver.

A simple developer formula was used comprising:

| Water | 100 ml |  |
| --- | --- | --- |
| Sodium hydroxide | 2.0 g |  |
| Potassium bromide | 1.0 g | pH ~ 13.7 |
| 5-Methylbenzotriazole | 0.05 g |  |
| 1-Phenyl-4-hydroxymethyl-4-methylpyrazolidin-3-one | 0.1 g |  |

After peeling the laminate apart, the receiver was rinsed briefly in demineralized water (pH 5.0) in order to reduce the pH of the receiver, and to attain the correct dye hues.

The dyed receiver layer was then tested as follows:

(a) Light Stability

The light stability of the dyes was determined using a Fluorescent Rapid Exposure Device. The mordanted dyes are subjected to 20 hours of high intensity light in a fadometer. The figure in brackets in Table I gives the percent fade using a Wratten 2B ultraviolet filter.

(b) Spectral Absorption Properties

The dyed mordant layers were examined, and the spectral absorption peak and shoulder (if any) recorded. The half band width (the wavelength range of the curve at half the maximum density) was also determined.

The results are tabulated in Table I below in which the dyes are all of the formula:

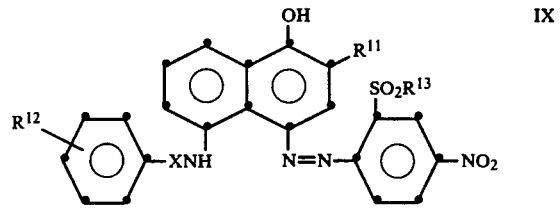

IX wherein $R^{11}$, $R^{12}$, $R^{13}$ and X are defined in Table I.

TABLE I

| Example | —$R^{11}$ | $R^{13}$ | —$R^{12}$ | X | % fade $\lambda_{max}$ and shoulder (sh) nm (if present) half band width nm | | |
| --- | --- | --- | --- | --- | --- | --- | --- |
| | | | | | Mordant 1 | Mordant 2 | Mordant 3 |
| Control | —H | —$CH_3$ | m-$SO_2NH_2$ | $SO_2$ | 28 (8) 640, 615(sh) 100 | 28 (11) 641, 610(sh) 100 | 9 (4) 640, 610(sh) 99 |

TABLE I-continued

| Example | —$R^{11}$ | $R^{13}$ | —$R^{12}$ | X | Mordant 1 % fade, $\lambda_{max}$/sh nm, half band width nm | Mordant 2 | Mordant 3 |
|---|---|---|---|---|---|---|---|
| 3 | —CO—N($C_2H_5$)—C$_6$H$_4$—COOH | —$CH_3$ | m-$SO_2NH_2$ | CO | 9 (2) / 656 / 90 | 16 (4) / 656 / 96 | 2 (0) / 654 / 93 |
| 4 | —CO—N($C_2H_5$)—C$_6$H$_4$—COOH | —$CH_3$ | p-$SO_2NH_2$ | $SO_2$ | 13 (3) / 654 / 88 | 11 (3) / 651 / 90 | 3 (0) / 651 / 86 |
| 5 | —CO—N(piperidino) | —$CH_3$ | m-$SO_2NH_2$ | $SO_2$ | 14 (4) / 651, 620(sh) / 96 | 15 (5) / 650, 620(sh) / 102 | 5 (0) / 648, 620(sh) / 92 |
| 6 | —CO—N($C_2H_5$)—C$_6$H$_4$—COOH | —$CH_3$ | m-$SO_2NH_2$ | $SO_2$ | 14 (4) / 654 / 84 | 15 (6) / 650 / 88 | 3 (0) / 648 / 82 |
| 7 | —CO—N(piperidinyl-COOH) | —$CH_3$ | m-$SO_2NH_2$ | $SO_2$ | 19 (4) / 650 / 88 | 17 (4) / 650 / 94 | 12 (2) / 649 / 84 |
| 8 | —CO—N(morpholino) | —$CH_3$ | m-$SO_2NH_2$ | $SO_2$ | 11 (0) / 650, 621(sh) / 94 | 15 (7) / 649, 618(sh) / 99 | 5 (1) / 646, 616(sh) / 92 |
| 9 | —CO—N(piperidinyl-COOH) | —$CH_3$ | m-$SO_2NH_2$ | CO | 17 (4) / 658 / 92 | 25 (6) / 657 / 96 | 6 (0) / 652 / 95 |
| 10 | —CO—N($C_2H_5$)—C$_6$H$_4$—COOH | —$CH_3$ | p-$SO_2NH_2$ | CO | 5 (1) / 655 / 94 | 14 (4) / 657 / 102 | 4 (0) / 654 / 96 |
| 11 | —CO—N($C_2H_5$)—C$_6$H$_4$—$SO_2NH_2$ | —$CH_3$ | m-COOH | $SO_2$ | 11 (4) / 656 / 88 | 12 (4) / 656 / 99 | 5 (0) / 653 / 87 |
| 12 | —CO—N($C_2H_5$)—C$_6$H$_4$—$SO_2NH_2$ | —$CH_3$ | m-COOH | CO | 13 (2) / 660 / 93 | 14 (5) / 661 / 100 | 3 (0) / 658 / 94 |

Mordant 1 was poly[styrene-co-N-benzyl-N,N-dimethyl-N-(3-maleimidopropyl)ammonium chloride].

Mordant 2 was poly[styrene-co-vinylbenzyltrimethylammonium chloride-co-1,4-divinylbenzene].

Mordant 3 was poly(1-vinylimidazole).

Note the low percent fade of the examples as compared to the fade of the control.

EXAMPLE 13

The stability on keeping under hot, humid conditions was tested for the cyan dyes of this invention and those dyes described in U.S. Patent 4,013,635 as follows:

An element containing the following structure:

| Support |
|---|
| Acid Layer |
| Silver Halide Emulsion |
| Dye Releaser | was prepared by coating on a paper support the dye releaser tested in a coupler solvent and overcoating with a silver halide emulsion layer and overcoating with an acid layer comprising a copolymer of butyl acrylate and acrylic acid (30:80 by weight).

The element was exposed through a test object and the element was then soaked in a processing composition containing 0.5 M potassium hydroxide, 10 g/liter aminohexanoic acid, 2 g/liter 11-aminodecanoic acid, 1 g/liter 5-methylphenyltriazole and 10 ml/liter benzyl alcohol for 15 seconds at 80° F. and then laminating the element for 2 minutes with a paper support coated with a receiving layer comprising a mordant having the formula:

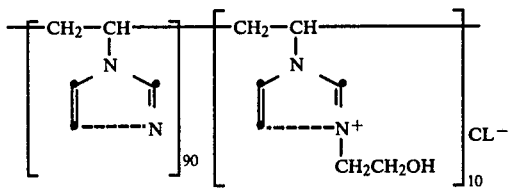

(200 mg/ft$^2$), gelatin (100 mg/ft$^2$), 1-phenyl-4-methyl-4-hydroxymethyl-3-pyrazolidone (15 mg/ft$^2$) and formaldehyde (1.0 mg/ft$^2$).

The elements were then peeled apart and the density of the dye in the receiver was then measured and subsequently measured at 7 days after being kept at 140° F. and 70 percent relative humidity. The following Table II shows the results obtained.

TABLE II

| Example | Dye Releaser * | ΔD at D = 1.0 |
|---|---|---|
| 13 | A | −0.27 |
| Control 1 | B (U.S. Pat. No. 4,013,635) | −0.39 |
| Control 2 | C (U.S. Pat. No. 4,013,635) | −0.48 |

It is thus seen that the element of the instant invention lost far less dye density than that of the controls.

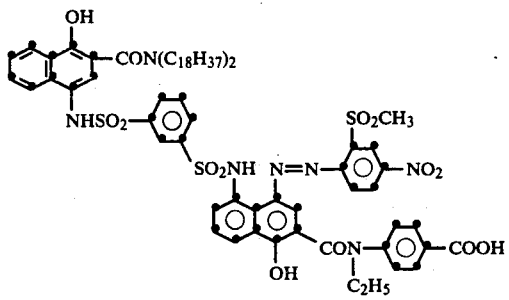

A

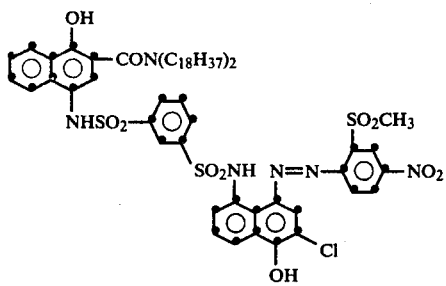

B

-continued

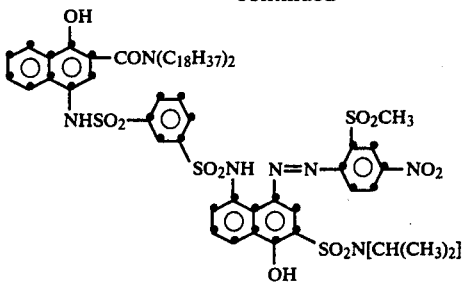

C

The invention has been described in detail with particular reference to preferred embodiments thereof, but it will be understood that variations and modifications can be effected within the spirit and scope of the invention.

What is claimed is:

1. A photographic element comprising a support having thereon at least one photosensitive silver halide emulsion layer, said emulsion layer having associated therewith a nondiffusible compound which releases a diffusible cyan dye, said compound having the following formula:

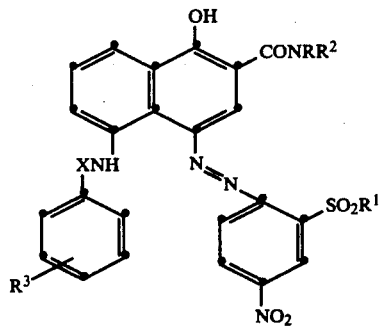

wherein:
R$^1$ is selected from the group consisting of aryl, alkyl and NR$^{11}$R$^{12}$ wherein R$^{11}$ is alkyl or aryl, R$^{12}$ is alkyl, or R$^{11}$ and R$^{12}$, taken together with the nitrogen atom to which they are attached, is a heterocyclic group;
X is —CO— or —SO$_2$—;
R$^3$ is —COOH or —CAR and is attached in the meta or para position to X in the benzene ring;
R is alkyl;
R$^2$ is

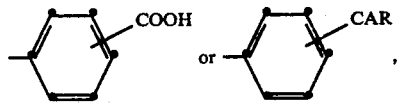

or can be taken together with R and the nitrogen atom to which it is attached to form a heterocyclic ring, unsubstituted or substituted with a carboxy group; and
CAR is a ballasted carrier moiety which, as a function of oxidation under alkaline conditions, releases a diffusible dye, with the proviso that the compound contains at least one CAR group and, except when R and R$^2$ form a heterocyclic group and X is —SO$_2$—, must contain at least one carboxy group.

2. The photographic element of claim 1 wherein CAR has the formula:

(Ballast-Carrier-Link)- wherein:
(a) Ballast is an organic ballasting radical of such molecular size and configuration as to render said compound nondiffusible in said photographic element during development in an alkaline processing composition;
(b) Carrier is an oxidizable acyclic, carbocyclic or heterocyclic moiety; and
(c) Link represents a group which upon oxidation of said carrier moiety is capable of being hydrolytically cleaved to release said diffusible dye.

3. The photographic element of claim 1 wherein the Carrier moiety contains atoms according to the following configuration:

$$a(-C=C)_b-$$

wherein:
b is a positive integer of 1 to 2; and
a represents the radicals OH, SH, NH—, or hydrolyzable precursors thereof.

4. The photographic element of claim 1 wherein said carrier moiety is a group having the formula:

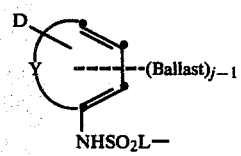

wherein:
(a) Ballast is an organic ballasting radical of such molecular size and configuration as to render said compound nondiffusible in said photographic element during development in an alkaline processing composition;
(b) D is ortho or para to NHSO$_2$L- and comprises OR$^4$ or NHR$^5$ wherein R$^4$ is hydrogen or a hydrolyzable moiety and R$^5$ is hydrogen or a substituted or unsubstituted alkyl group of 1 to 22 carbon atoms;
(c) Y represents the atoms necessary to complete a benzene nucleus, a naphthalene nucleus, or a 5 to 7 membered heterocyclic ring;
(d) j is a positive integer of 1 to 2 and is 2 when D is OR$^4$ or when R$^5$ is hydrogen or an alkyl group of less than 8 carbon atoms; and
(e) L is a linking group which is [X-(NR$^6$-J)$_q$]$_m$- or X-J-NR$^6$- wherein:
  (i) X represents a bivalent linking group of the formula -R$^7$-L'$_n$-R$^7{}_p$- where each R$^7$ can be the same or different and each represents an alkylene radical having 1 to about 8 carbon atoms; a phenylene radical; or a substituted phenylene radical having 6 to about 9 carbon atoms;
  (ii) L' represents a bivalent radical selected from oxy, carbonyl, carboxamido, carbamoyl, sulfonamido, ureylene, sulfamoyl, sulfinyl or sulfonyl;
  (iii) n is an integer of 0 or 1;
  (iv) p is 1 when n equals 1 and p is 1 or 0 when n equals 0, provided that when p is 1 the carbon content of the sum of both R$^7$ radicals does not exceed 14 carbon atoms;
  (v) R$^6$ represents a hydrogen atom, or an alkyl radical having 1 to about 6 carbon atoms;
  (vi) J represents a bivalent radical selected from sulfonyl or carbonyl;
  (vii) q represents an integer of 0 or 1; and
  (viii) m represents an integer of 0, 1 or 2.

5. The photographic element of claim 1 wherein D is OH, j is 2, and Y is a naphthalene nucleus.

6. The photographic element of claim 1 wherein R$^1$ is alkyl, R$^2$ is

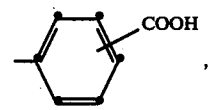

X is —SO$_2$— and R$^3$ is —CAR.

7. The photographic element of claim 1 wherein said diffusible dye is released as an inverse function of said development of said silver halide emulsion layer under alkaline conditions.

8. In a photographic assemblage comprising:
(a) a support having thereon at least one photosensitive silver halide emulsion layer having associated therewith a dye image-providing material;
(b) a dye image-receiving layer; and
(c) an alkaline processing composition and means for discharging same within said assemblage; said assemblage containing a silver halide developing agent, the improvement wherein said dye image-providing material is a nondiffusible compound having a releasable azo dye moiety, said compound having the following formula:

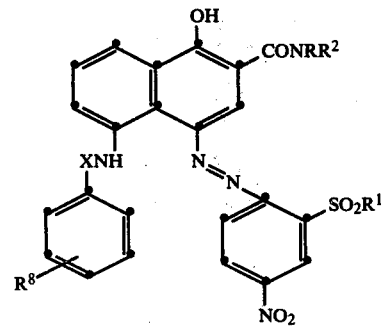

wherein:
R$^1$ is selected from the group consisting of aryl, alkyl and NR$^{11}$R$^{12}$ wherein R$^{11}$ is alkyl or aryl and R$^{12}$ is alkyl, or R$^{11}$ and R$^{12}$, taken together with the nitrogen atom to which they are attached, is a heterocyclic group;
X is —CO— or —SO$_2$—;
R$^3$ is —COOH or —CAR and is attached in the meta or para position to X in the benzene ring;
R is alkyl;
R$^2$ is

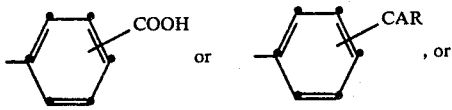

or can be taken together with R and the nitrogen atom to which they are attached to form a heterocyclic ring, unsubstituted or substituted with a carboxy group; and CAR is a ballasted carrier moiety which, as a function of oxidation under alkaline conditions, releases a diffusible dye, with the proviso that the compound contains at least one CAR group and, except when R and $R^2$ form a heterocyclic group and X is $-SO_2-$, must contain at least one carboxy group.

9. The photographic assemblage of claim 8 wherein CAR has the formula:

(Ballast-Carrier-Link)- wherein:
(a) Ballast is an organic ballasting radical of such molecular size and configuration as to render said compound nondiffusible in said photographic assemblage during development in an alkaline processing composition;
(b) Carrier is an oxidizable acyclic, carbocyclic or heterocyclic moiety; and
(c) Link represents a group which upon oxidation of said carrier moiety is capable of being hydrolytically cleaved to release said diffusible azo dye.

10. The photographic assemblage of claim 8 wherein the Carrier moiety contains atoms according to the following configuration:

$$a(-C=C)_b-$$

wherein:
b is a positive integer of 1 to 2; and
a represents the radicals OH, SH, NH-, or hydrolyzable precursors thereof.

11. The photographic assemblage of claim 8 wherein said Carrier moiety is a group having the formula:

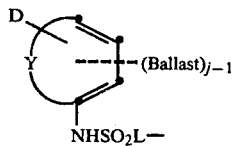

wherein:
(a) Ballast is an organic ballasting radical of such molecular size and configuration as to render said compound nondiffusible in said photographic assemblage during development in an alkaline processing composition;
(b) D is ortho or para to $NHSO_2L-$ and comprises $OR^4$ or $NHR^5$ wherein $R^4$ is hydrogen or a hydrolyzable moiety and $R^5$ is hydrogen or a substituted or unsubstituted alkyl group of 1 to 22 carbon atoms;
(c) Y represents the atoms necessary to complete a benzene nucleus, a naphthalene nucleus, or a 5 to 7 membered heterocyclic ring;

(d) j is a positive integer of 1 to 2 and is 2 when D is $OR^4$ or when $R^5$ is hydrogen or an alkyl group of less than 8 carbon atoms; and
(e) L is a linking group which is $[X-(NR^6-J)_q]_m-$ or $X-J-NR^6-$ wherein:
(i) X represents a bivalent linking group of the formula $-R^7-L'_n-R^7_p-$ where each $R^7$ can be the same or different and each represents an alkylene radical having 1 to about 8 carbon atoms; a phenylene radical; or a substituted phenylene radical having 6 to about 9 carbon atoms;
(ii) L' represents a bivalent radical selected from oxy, carbonyl, carboxamido, carbamoyl, sulfonamido, ureylene, sulfamoyl, sulfinyl or sulfonyl;
(iii) n is an integer of 0 or 1;
(iv) p is 1 when n equals 1 and p is 1 or 0 when n equals 0, provided that when p is 1 the carbon content of the sum of both $R^7$ radicals does not exceed 14 carbon atoms;
(v) $R^6$ represents a hydrogen atom, or an alkyl radical having 1 to about 6 carbon atoms;
(vi) J represents a bivalent radical selected from sulfonyl or carbonyl;
(vii) q represents an integer of 0 or 1; and
(viii) m represents an integer of 0, 1 or 2.

12. The photographic assemblage of claim 8 wherein D is OH, j is 2 and Y is a naphthalene nucleus.

13. The photographic assemblage of claim 8 wherein:
(a) said dye image-receiving layer is located between said support and said silver halide emulsion layer; and
(b) said assemblage also includes a transparent cover sheet over the layer outermost from said support.

14. The photographic assemblage of claim 13 wherein said cover sheet has thereon, in sequence, a neutralizing layer and a timing layer.

15. The photographic assemblage of claim 8 wherein said discharging means is a rupturable container containing said alkaline processing composition and an opacifying agent, said container being so positioned during processing of said assemblage that a compressive force applied to said container will effect a discharge of the container's contents between said transparent sheet and the layer outermost from said support.

16. The photographic assemblage of claim 15 wherein said support having thereon said photosensitive silver halide emulsion layer is opaque and said dye image-receiving layer is located on a separate transparent support superposed over the layer outermost from said opaque support.

17. In an integral photographic assemblage comprising:
(a) a photosensitive element comprising a transparent support having thereon the following layers in sequence: a dye image-receiving layer, an alkaline solution-permeable, light-reflective layer, an alkaline solution-permeable, opaque layer, a red-sensitive silver halide emulsion layer having a ballasted cyan dye releaser associated therewith, a green-sensitive silver halide emulsion layer having a ballasted magenta dye releaser associated therewith, and a blue-sensitive silver halide emulsion layer having a ballasted yellow dye releaser associated therewith;
(b) a transparent sheet superposed over said blue-sensitive silver halide emulsion layer and comprising a transparent support having thereon, in sequence, a neutralizing layer and a timing layer; and (c) a rupturable container containing an alkaline processing composition and an opacifying agent which is so positioned during processing of said assemblage that a compressive force applied to said container will effect a discharge of the container's contents between said transparent sheet and said blue-sensitive silver halide emulsion layer; said assemblage containing a silver halide developing agent; the improvement wherein at least one of said ballasted dye releasers is a nondiffusible compound having a releasable azo dye moiety, said compound having the following formula:

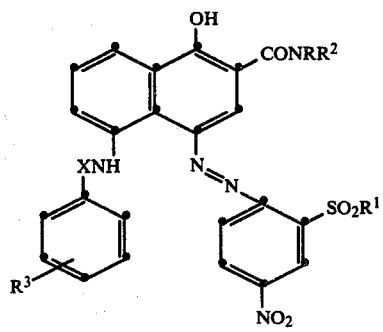

wherein:

$R^1$ is selected from the group consisting of aryl, alkyl, and $NR^{11}R^{12}$ wherein $R^{11}$ is alkyl or aryl and $R^{12}$ is alkyl, or $R^{11}$ and $R^{12}$, taken together with the nitrogen atom to which they are attached, is a heterocyclic group;

X is —CO— or —SO$_2$—;

$R^3$ is —COOH or —CAR and is attached in the meta or para position to X in the benzene ring;

R is alkyl;

$R^2$ is

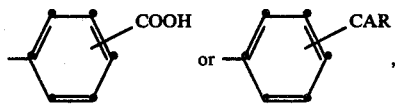

or can be taken together with R and the nitrogen atom to which it is attached to form a heterocyclic ring, unsubstituted or substituted with a carboxy group; and CAR is a ballasted carrier moiety which, as a function of oxidation under alkaline conditions, releases a diffusible dye, with the proviso that the compound contains at least one CAR group and, except when R and $R^2$ form a heterocyclic group and X is —SO$_2$—, must contain at least one carboxy group.

18. A process for producing a photographic transfer image in color comprising:
(a) imagewise exposing the photographic element of claim 1;
(b) treating said imagewise-exposed photographic element with an alkaline processing composition in the presence of a silver halide developing agent to effect development of each of the exposed silver halide emulsion layers,
(c) said nondiffusible compound then releasing said diffusible dye imagewise as a function of said development of each of said silver halide emulsion layers; and
(d) at least a portion of said imagewise distribution of said dye diffusing to a dye image-receiving layer.

19. The process of claim 18 wherein CAR has the formula:

(Ballast-Carrier-Link)- wherein:
(a) Ballast is an organic ballasting radical of such molecular size and configuration as to render said compound nondiffusible in said photographic element during development in an alkaline processing composition;
(b) Carrier is an oxidizable acyclic, carbocyclic or heterocyclic moiety; and
(c) Link represents a group which upon oxidation of said carrier moiety is capable of being hydrolytically cleaved to release said diffusible dye.

20. The process of claim 18 wherein the Carrier moiety contains atoms according to the following configuration:

$$a(-C=C)_b-$$

wherein:
b is a positive integer of 1 or 2; and
a represents the radicals OH, SH, NH—, or hydrolyzable precursors thereof.

21. The process of claim 18 wherein said carrier moiety is a group having the formula:

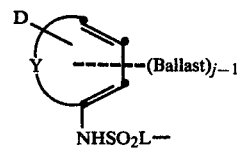

wherein:
(a) Ballast is an organic ballasting radical of such molecular size and configuration as to render said compound nondiffusible in said photographic element during development in an alkaline processing composition;
(b) D is ortho or para to NHSO$_2$L— and comprises OR$^4$ or NHR$^5$ wherein R$^4$ is hydrogen or a hydrolyzable moiety and R$^5$ is hydrogen or a substituted or unsubstituted alkyl group of 1 to 22 carbon atoms;
(c) Y represents the atoms necessary to complete a benzene nucleus, a naphthalene nucleus, or a 5 to 7 membered heterocyclic ring;
(d) j is a positive integer of 1 to 2 and is 2 when D is OR$^4$ or when R$^5$ is hydrogen or an alkyl group of less than 8 carbon atoms; and
(e) L is a linking group which is [X—(NR$^6$—J)$_q$]$_m$— or X—J—NR$^6$— wherein:
(i) X represents a bivalent linking group of the formula —R$^7$—L$'_n$—R$^7_p$— where each R$^7$ can be the same or different and each represents an alkylene radical having 1 to about 8 carbon atoms; a phenylene radical; or a substituted phenylene radical having 6 to about 9 carbon atoms;
(ii) L' represents a bivalent radical selected from oxy, carbonyl, carboxamido, carbamoyl, sulfonamido, ureylene, sulfamoyl, sulfinyl or sulfonyl;
(iii) n is an integer of 0 or 1;

(iv) p is 1 when n equals 1 and p is 1 or 0 when n equals 0, provided that when p is 1 the carbon content of the sum of both $R^7$ radicals does not exceed 14 carbon atoms;

(v) $R^6$ represents a hydrogen atom, or an alkyl radical having 1 to about 6 carbon atoms;

(vi) J represents a bivalent radical selected from sulfonyl or carbonyl;

(vii) q represents an integer of 0 or 1; and (viii) m represents an integer of 0, 1 or 2.

22. The process of claim 18 wherein D is OH, j is 2 and Y is a naphthalene nucleus.

* * * * *